United States Patent

Neeser et al.

[11] Patent Number: 5,050,059
[45] Date of Patent: Sep. 17, 1991

[54] FREQUENCY CHANGER HAVING PARALLEL PARTIAL FREQUENCY CHANGERS WITH A DC CIRCUIT

[75] Inventors: Gerhard Neeser, Neunkirchen; Jens Hamann, Fuerth-Stadeln, both of Fed. Rep. of Germany

[73] Assignee: Siemens Aktiengesellschaft, Berlin & Munich, Fed. Rep. of Germany

[21] Appl. No.: 393,665

[22] Filed: Aug. 14, 1989

[30] Foreign Application Priority Data

Aug. 12, 1988 [DE] Fed. Rep. of Germany ... 8810279[U]

[51] Int. Cl.$^5$ ............................................ H02M 5/45
[52] U.S. Cl. .......................................... 363/65; 363/37
[58] Field of Search ......................... 363/35, 37, 51, 65, 363/69, 70, 71; 318/798, 799, 801, 803, 806–812

[56] References Cited

U.S. PATENT DOCUMENTS

| | | | |
|---|---|---|---|
| 3,792,286 | 2/1974 | Meier | 307/58 |
| 4,084,220 | 4/1978 | Akamatsu | 363/65 |
| 4,349,772 | 9/1982 | Weiss | 363/65 |
| 4,392,099 | 7/1983 | Kuniyoshi | 363/65 |
| 4,518,908 | 5/1985 | Wiart | 318/723 |
| 4,553,197 | 11/1985 | Stemmler | 363/37 |
| 4,814,964 | 3/1989 | Schauder et al. | 363/37 |
| 4,849,870 | 7/1989 | Heinrich | 363/65 |

FOREIGN PATENT DOCUMENTS

| | | |
|---|---|---|
| 1959223 | 6/1970 | Fed. Rep. of Germany. |
| 2103230 | 8/1972 | Fed. Rep. of Germany. |
| 3508261 | 9/1986 | Fed. Rep. of Germany. |

OTHER PUBLICATIONS

Patents Abstracts of Japan, E-30, Oct. 18, 1980, vol. 4, No. 148, JP 55-100067.
Patents Abstracts of Japan, E-33, Nov. 12, 1980, vol. 4, No. 162, JP 55-111666.
Patents Abstracts of Japan, E-271, Oct. 9, 1984, vol. 8, No. 221, JP 59-103576.
Brown Boveri Technik, 6/86, "Der schnellaufende Stromrichtermotor als getriebeloser Kesselspeisepumpenamtrieb".

Primary Examiner—Peter S. Wong
Attorney, Agent, or Firm—Kenyon & Kenyon

[57] ABSTRACT

A frequency changer having parallel partial frequency changers with a dc circuit has chokes that impress dc currents. These chokes are magnetically coupled to each other such that the change of a dc current in one of the partial frequency changers causes a corresponding change of the dc currents in the parallel partial frequency changer in the sense of a lead control. In a frequency changer constructed with an even number of partial frequency changers, the individual chokes can be coupled such that the magnetic dc fluxes in the coupling caused by the dc currents in the chokes are compensated.

7 Claims, 4 Drawing Sheets

FREQUENCY CHANGER HAVING PARALLEL PARTIAL FREQUENCY CHANGERS WITH A DC CIRCUIT

FIELD OF THE INVENTION

The present invention relates to a frequency changer having at least two parallel, metallically separated partial frequency changers with an intermediate dc circuit and chokes in the intermediate circuit.

BACKGROUND OF THE INVENTION

A parallel circuit having identical, known frequency changer circuits can be used to increase the maximally deliverable electric power to a load. Parallel partial frequency changers further can be operated with different gating angles. Due to the separate single or multiphase systems at the output of the partial frequency changers a resulting rotating field with a larger number of pulses is formed in the load by superposition of the rotating fields of the partial frequency changers caused in the load. Since more commutations of respective phaseshifted electrical output variables of the partial frequency changers per unit time therefore contribute to the formation of output variables of the complete frequency changer, these output variables have a spectrum of harmonics shifted toward higher frequencies, and therefore considerably less ripple.

In frequency changers or partial frequency changers with a dc circuit, such as an intermediate dc link internal to the circuit, chokes are used for impressing the current in the dc link. However, since the chokes are premagnetized by a dc field, they have only a qualified limiting effect on current rise it the dc current rises out of control. This can occur, for instance, in the case of a short circuit, since the saturation state is reached quickly.

In the operation of frequency changers constructed from parallel identical partial frequency changers, no appreciable deviations of the operating point should occur in parallel operation between the partial frequency changers. This is important since each of the partial frequency changers provides at the output a separate single or multiphase system which causes a rotating field of its own in the load. Thus, even during transients the instantaneous values of the dc currents in the dc circuits of the partial frequency changers themselves should deviate from each other only up to a maximally permissible value. In the event of sudden changes of the reference value or when there is a fault in one of the parallel partial frequency changers, as can occur when there is a short circuit due to a commutation failure caused by conduction-through of a valve in the inverter part of this partial frequency changer, undesirable operating point deviations between the parallel partial frequency changers could not be avoided in the prior art. Thus, there existed the danger that a heavily fanned-up transient short-circuit current cusp would occur in the dc circuit of the disturbed partial frequency changer, while the remaining parallel partial frequency changer would try to continue in normal operation at least until the for instance, a frequency converter constructed of several parallel partial frequency changers with intermediate dc circuits acts on a so-called "converter motor" for the operation of a synchronous machine, then an asymmetrically occurring short-circuit current in one of the parallel partial frequency changers will stress the rotating synchronous machine considerably. This leads to heavy control deviations in the controllers for the converters on the network and load sides in the individual partial frequency changer.

From Japanese Patent Publication JP No. 44-111 666 (A) in "Patent Abstracts of Japan", E-33, Nov. 12, 1980, Vol. 4/No. 162, a frequency converter is known in which three single-phase frequency changers with intermediate dc circuits and chokes in each of the respective intermediate links form a three-phase system for a load. The inverters at the output of the single-phase frequency converters are wired together metallically for forming the rotating field for the load. Furthermore, the chokes in the individual dc circuits are coupled to each other magnetically to increase the smoothing action. However, in this type of frequency changer, the coupling of the chokes does not provide any mutual precontrol of the dc current in the intermediate links of the respective singlephase frequency changers.

SUMMARY OF THE INVENTION

The present invention provides a frequency changer having at least two parallel metallically separate partial frequency changers, each partial frequency changer having an intermediate dc circuit and chokes in the intermediate dc circuit Each partial frequency converter forms a separate single or multiphase system that works in parallel on a load such that each of the single or multiphase systems causes a rotating field in the load. Magnetic couplings couple the chokes of the parallel partial frequency changers to each other such that a change of the dc current in the intermediate dc circuit of one partial frequency changer causes a change of the dc currents in the intermediate dc circuits of another parallel partial frequency changer in the sense of a precontrol.

DETAILED DESCRIPTION

Figure 1:
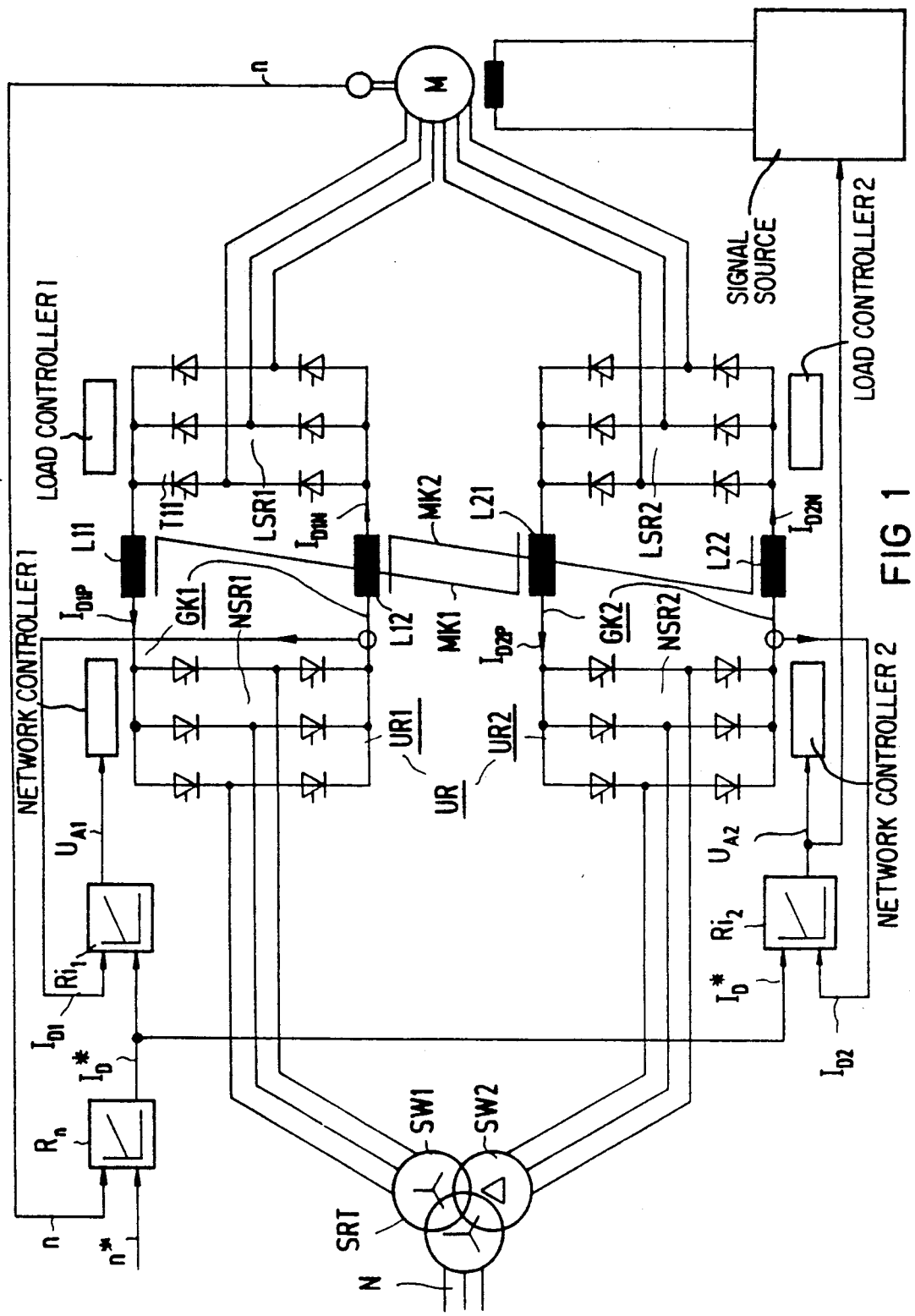
FIG. 1 shows a frequency changer constructed according to an embodiment of the present invention, having a parallel connection of two partial frequency changers operating a synchronous machine as the load.

The frequency changer UR shown in the embodiment of FIG. 1 comprises two parallel partial frequency changers UR1 and UR2. In FIG. 1, these partial frequency changers UR1, UR2 feed a rotating electric machine serving as the load. The electric machine is a synchronous machine in FIG. 1. The frequency changer UR can also feed another network within a high voltage dc transmission system. Each partial frequency changer acts as a six-pulse frequency changer with an intermediate dc link. Thus, the converter NSR1 on the network side is coupled in the partial frequency changer UR1 to the converter LSR1 on the load side via a dc circuit GK1. In the same manner, the dc circuit GK2 couples the converter NSR2 to the converter LSR2 on the load side in the partial frequency changer UR2. The converters on the network side of both partial frequency changers are fed from the network N via a converter transformer SRT that has separate secondary windings SW1 and SW2. Chokes L11, L12 are provided for impressing the dc currents in the dc circuits of the partial frequency changer. Thus, the chokes L11 and L12 impress the dc currents $I_{D1P}$ and $I_{D1N}$ in the dc circuit GK1. Similarly, the chokes L21 and L22 serve to impress the dc currents $I_{D2P}$ and $I_{D2N}$ in the dc circuit GK2 of the partial frequency changer UR2.

In the embodiment of FIG. 1, the chokes in the dc circuits of the two parallel partial frequency changers UR1 and UR2 are magnetically coupled so that an increase of the dc current $I_{D1P}$ in the dc circuit GK1 of the partial frequency changer UR1 causes by voltage induction an increase of the dc current $I_{D2P}$ in the dc circuit GK2 of the partial frequency changer UR2 in the sense of a precontrol or lead control. This is performed in the embodiment of FIG. 1 by the magnetic couplings MK1 and MK2 for the chokes L11, L21 and L12, L22 respectively. Each of the two arrangements consisting of the elements L11, MK1, L21, primary and secondary sides of which are formed by the intermediate link chokes of the two partial frequency changers. In this manner, parallel operation of the two partial frequency changers UR1 and UR2 in the frequency changer UR can be ensured.

The magnetic coupling according to the invention is applicable to all forms of partial frequency changers which are provided with a dc circuit at the input, at the output and internally to the circuit. The frequency changer can be constructed of any even or uneven number of parallel partial frequency changers. For clarity, the invention is further illustrated by the example of frequency changers in which six-pulse intermediate dc circuit partial frequency changers are used as the basic converter circuit.

If a frequency changer is constructed from an even number of parallel partial frequency changers, the chokes in the dc circuits of the individual partial frequency changers can be magnetically coupled such that the dc fluxes caused by the dc currents through the coupled chokes cancel each other in the coupling. For example, in the frequency changer UR in FIG. 1, the magnetic dc flux caused by the current $I_{D1N}$ in the choke L12 can be compensated by the magnetic dc flux caused by the dc current $I_{D2N}$ in the choke L22. The coupling of the chokes, however, can also be made so that the dc fluxes caused in the magnetic coupling of the individual chokes add up. This has the advantage that the sum of the dc components of the individual dc fluxes in the couplings becomes smaller. Overall, an attenuation of the harmonics caused by the commutations of the components of the partial frequency changers in the dc currents of the individual dc circuits is obtained.

In an embodiment of the present invention, the parallel partial frequency changers are clocked relative to each other phase-shifted in such a manner that the number of pulses of the entire frequency changer is larger than the number of pulses of the individual partial frequency changers. This will be explained further by the embodiment of FIG. 1. The drive of a synchronous machine that is shown there in the form of a block diagram is also called a converter motor M. Two six-pulse partial converters UR1 and UR2 operating on the load in parallel provide 12-pulse generation of a three-phase system at the output of the frequency changer UR. For this purpose, the two partial frequency changers UR1, UR2 are supplied at the input with two three-phase systems that are phase-shifted 30° relative to each other. These three-phase systems are made available via Y or delta-connected secondary windings SW1 and SW2 of the converter transformer SRT. The converters NSR1 and NSR2 of the two partial frequency changers UR1 and UR2, serving as rectifiers, are clocked via the respective control units SZN1 and SZN2 with firing pulses likewise phase-shifted 30° relative to each other. Setting signals $U_{A1}$ and $U_{A2}$ are formed for these control units in dependence on the instantaneous values of the dc currents $I_{D1}$ and $I_{D2}$ in the respective dc circuits GK1, GK2 by subordinated dc current controller $Ri_1$ and $Ri_2$. A dc reference $I^*_D$ is made available to the dc current controllers $Ri_1$, $Ri_2$ by a superimposed speed controller Rn.

For the 12-pulse generation of a three-phase system at the output of the frequency changer UR, the switching elements in each of the partial frequency changers UR1 and UR2 are supplied with firing pulses depending on a predetermined commutation sequence every 60° of a phase of the network period, the firing pulses for the partial frequency changers being phase-shifted 30° relative to each other, as explained above. It will be assumed now that immediately after the delivery of the firing pulses for the valves of the partial frequency changer UR1, a short-circuit-like rise of the dc current $I_{D1P}$ occurs due to the flipping of the valve $T_{11}$ in the converter LSR1 on the load side. In order to brake the further rise of the short-circuit current, the reference value $I^*_D$ at the output of the speed controller Rn is reduced in order to switch the converter NSR1 on the network side to inverter operation. Such switching, however, is possible only at the end of the conduction period of the valves just fired, i.e., at the end of a nearly further 60° of a period of the network frequency. If by means of the magnetic couplings MK1 and MK2 a leading increase of the dc currents $I_{D2P}$ and $I_{D2N}$ in the dc circuit GK2 is caused due to the short-circuit-like current rise of $I_{D1P}$ or $I_{D1N}$, respectively, then the converter NSR2 on the network side of the partial frequency changer UR2 can be switched suddenly to the inverter flipping limit only 30° after the occurrence of a fault due to the now large control deviation present at the input of the dc current controller $Ri_2$. Thereby, the dc current $I_{D2P}$ or $I_{D2N}$, respectively, is greatly reduced so that the short circuit-like dc current in the dc circuit GK1 is braked in the sense of a lead control. This is done by the magnetic couplings MK1 and MK2 according to the invention still within the duration of current conduction of the valves fired prior to the occurrence of the fault of the partial frequency changer UR1.

The couplings of the chokes provides a considerable improvement in the parallel operation of the partial frequency changers within the frequency changer itself without substantially affecting the connected load by an asymmetrical fault in one of the partial frequency changers. Further, the load does not have to contribute substantially to the parallelization of the operating states in the partial frequency changers by coupling the partial frequency changers on the output side. In a similar manner, the coupling of the chokes causes in the event of a jump in the reference value $I^*_D$ for the dc currents, a lead control of the dc currents in the parallel partial frequency changers.

The magnetic coupling of the chokes in the dc circuits of parallel partial frequency changers of a frequency changer according to the invention is also advantageous if the partial frequency changers are clocked phase-shifted relative to each other to increase the number of pulses. A superposition of the current ripples generated by the commutations in the dc currents in the individual partial frequency changers takes place with the aid of the magnetic coupling provided in the frequency changer itself. This is advantageous if, according to the embodiment of FIG. 1, the twelve-pulse superposition of the three-phase system at the output of the partial frequency changers UR1 and UR2 takes place in the load itself. The rotating synchronous machine serving as the load is fed separately by the three-phase systems at the output of the parallel partial frequency changers. Due to the magnetic coupling of the two partial frequency changers UR1 and UR2, however, these three-phase systems generated with six pulses are loaded only with 12-pulse current ripple, which is more advantageous for the rotating synchronous machine. In this manner, the elimination of disturbing current harmonics, particularly of the 5th and 7th order, is accomplished outside of the load in the frequency changer itself.

Figure 2:
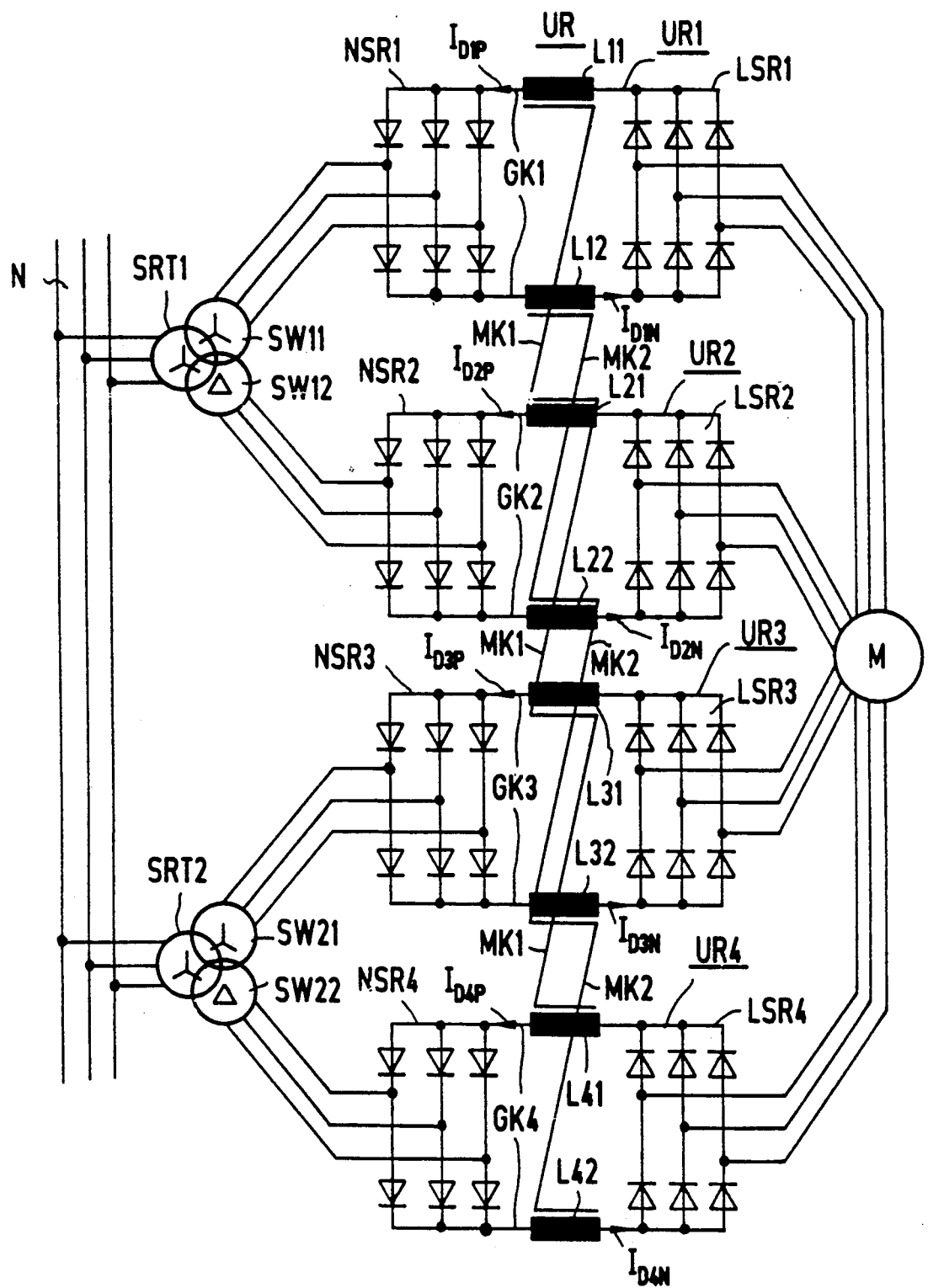
FIG. 2 shows an embodiment of the frequency changer of the present invention having a parallel connection of four partial frequency changers.

In FIG. 2, another embodiment of the present invention is shown in which the frequency changer UR has four parallel partial frequency changers UR1, UR2, UR3, UR4. Chokes L11, L12 and L21, L22 and L31, L32 and L41, L42 are provided between the converters on the network side and load side of each partial frequency changer and impress the dc currents in the dc circuits GK1, GK2, GK3, and GK4. The changes of a dc current of one of the parallel partial frequency changers will produce a corresponding change of the dc current in the dc circuits of the remaining parallel partial frequency changers in the sense of a lead control. This is advantageous for the synchronous running of parallel partial frequency changers in a frequency changer particularly if all partial frequency changers are clocked with the same phase. Also, the parallel coupling of partial frequency changers increases the energy transport to the load fed by the overall frequency changer.

As explained above, the magnetic coupling of the chokes is particularly advantageous with phase-shifted clocking of the individual parallel partial frequency changers. The embodiment of FIG. 2 can supply a rotating synchronous machine serving as the load with a three-phase system with 12 or 24 pulses. For this purpose two pairs of partial frequency changers are each fed by a converter transformer. Thus, the converter transformer SRT1 provides the two partial frequency changers UR1 and UR2 via the two Y- or delta connected secondary windings SW11 and SW12 with one three-phase system each, phase-shifted relative to each other by 30°. Similarly, the converter transformer SRT2 provides the partial frequency changers UR3 and UR4 via the Y- and delta-connected secondary windings SW21, SW22 with a three-phase system likewise phaseshifted relative to each other by 30°. If the load is to be fed with 12 pulses, two partial frequency changers are clocked in pairs with the same phase, where the clock pulses for the partial frequency changer pairs are phase-shifted 30° relative to each other. In the circuit of FIG. 2, this has the result that the partial frequency changers UR1 and UR3 are supplied with firing pulses at a phase angle of 0° and the partial frequency changers UR2 and UR4, respectively, are supplied with firing pulses at a phase angle of 30°. If, on the other hand, the load is to be fed with 24 pulses, each of the partial frequency changers are supplied with firing pulses relative to a period of the network phase at a different phase angle. For instance, the partial frequency changer UR1 would be supplied with firing pulses at 0°, the partial frequency changer UR3 at 15°, the partial frequency changer UR2 at 30° and the partial frequency changer UR4 at a phase shift of 45°.

Since the frequency changer UR in the embodiment of FIG. 2 has an even number of partial frequency changers, the magnetic coupling of the individual chokes can be made so that the dc fluxes by the dc currents in the respective chokes in the respective couplings are compensated.

Figure 3:
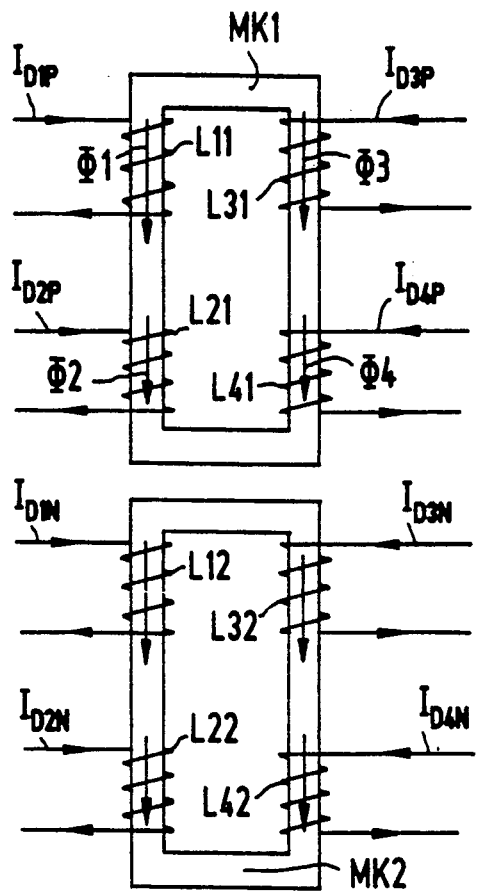
FIG. 3 illustrates an embodiment according to the present invention of the magnetic coupling of the chokes in the dc links of the four partial frequency changers of FIG. 2.

In FIG. 3, an embodiment such as a magnetic coupling is shown with an equivalent circuit diagram. The chokes L11, L21, L31 and L41 are coupled magnetically by the coupling and carry current from the corresponding dc currents $I_{D1P} \ldots I_{D4P}$ in such a manner that the coils L11, L21 and L31, L41 respectively form the primary and secondary sides of a transformer through which dc current flows. In this manner, the dc fluxes of the coils L11, L21 and the dc fluxes of the coils L31, L41 are added and all dc fluxes overall are compensated. Similarly, the coils L12, L22 and L32, L42 form the primary and secondary sides of another dc current-carrying transformer which is formed by the magnetic coupling MK2. The directions of the dc currents flowing through the individual chokes can also be chosen so that the chokes L11, L41, L12, L42 form the primary sides while the chokes L31, L21 and L32, L22 form the secondary sides of transformers.

Figure 4:
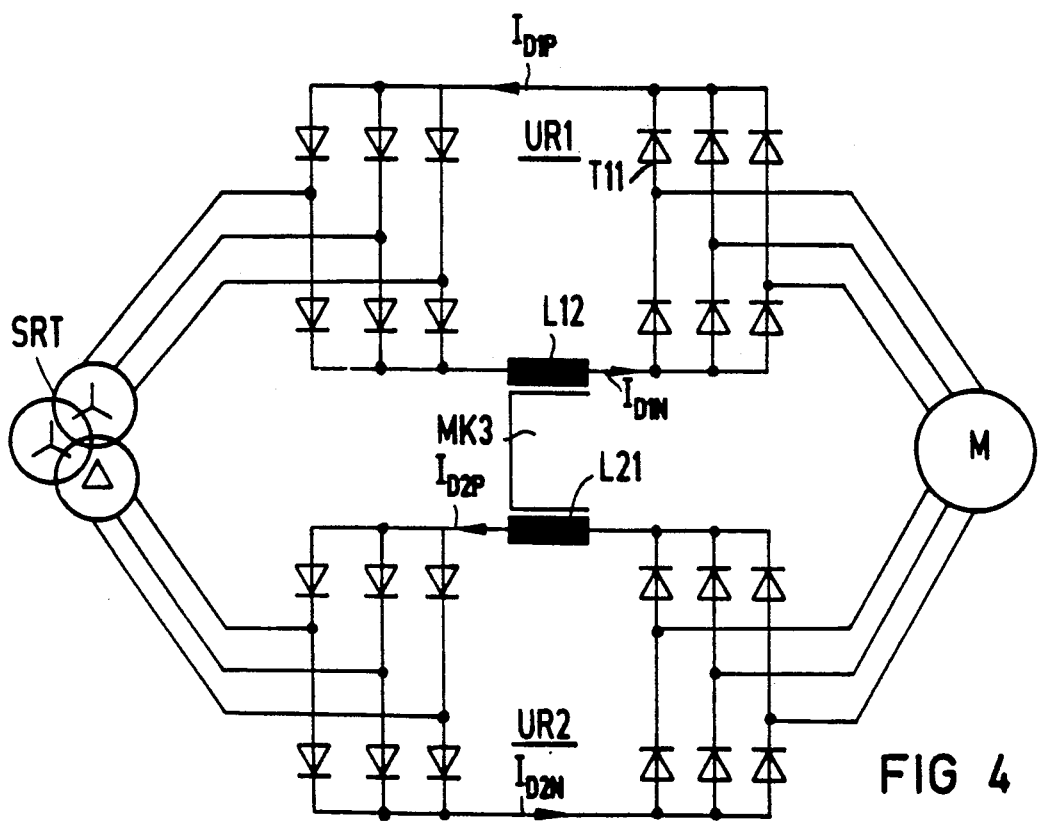
FIG. 4 shows another embodiment of a frequency changer having a parallel circuit of two partial frequency changers.

In FIG. 4, another embodiment of a frequency changer constructed according to the present invention is shown. Here, the two parallel partial frequency changers UR1 and UR2 have only chokes L12 and L21 in the respective dc circuits for impressing dc current, where the choke L12 is arranged in the section carrying dc current $I_{D1N}$ and the choke L21 is arranged in the section carrying dc current $I_{D2P}$ in the respective dc circuits. In this embodiment, considering the different dc flow directions, a magnetic coupling MK3 of the two chokes with simultaneous compensation or addition of the magnetic dc fluxes in the coupling is possible.

Figure 5:
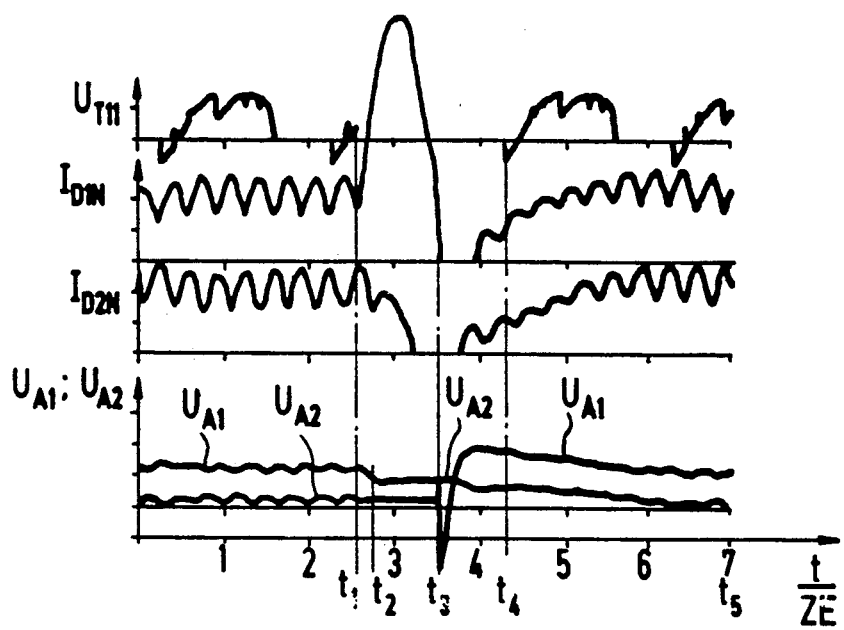
FIG. 5 shows exemplary waveforms of dc currents and dc current-control setting signals in the event of a short-circuit in the inverter part of a frequency changer having two parallel partial frequency changers.
Figure 6:
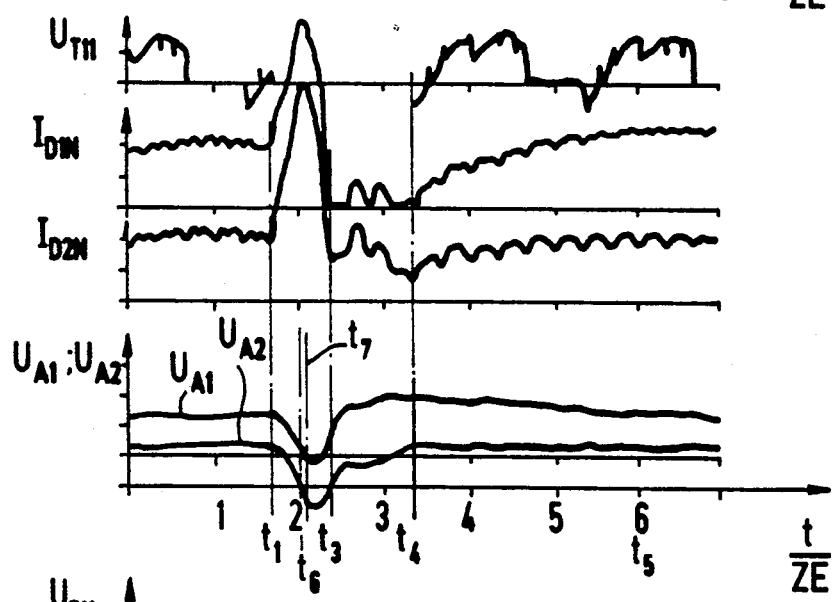
FIG. 6 shows exemplary waveforms of the dc currents and dc current-control setting signals in the event of a short-circuit in the inverter part of two partial frequency changers coupled in parallel according to the embodiment of FIG. 1.
Figure 7:
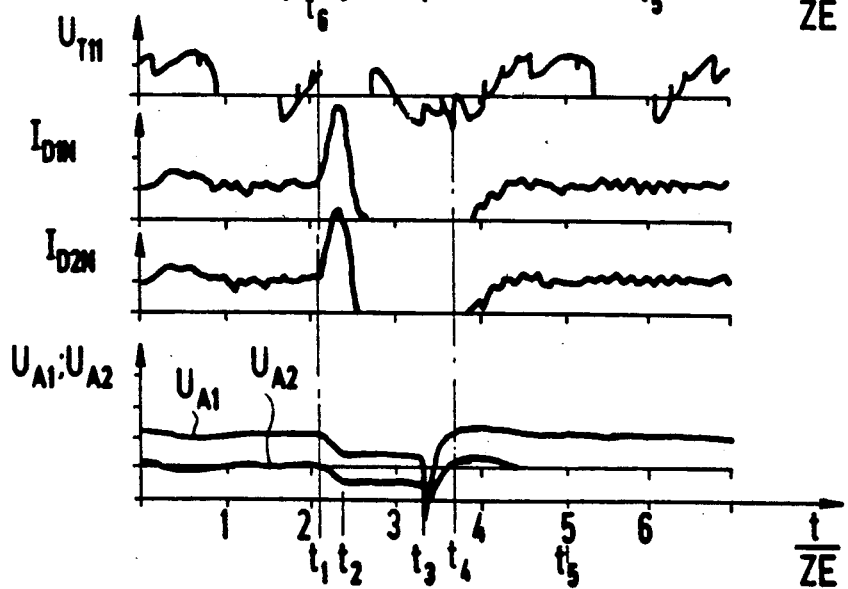
FIG. 7 shows waveforms corresponding to the waveforms of FIG. 6, when there is additional blocking of the dc controllers for the duration of the fault.

FIGS. 5-7 show the waveforms of the dc current $I_{D1N}$, $I_{D2N}$ and of the setting signal $U_{A1}$, $U_{A2}$ at the output of the dc current controllers $Ri_1$, $Ri_2$ which occur with the temporary flipping of the switching element T11 in the frequency changer LSR on the load side. FIG. 5 shows the waveforms in a frequency changer without the magnetic coupling of the chokes in the dc circuit of the partial frequency changers while FIGS. 6 and 7 show the waveforms in a frequency changer with the magnetic coupling of the chokes.

According to FIG. 5, it is first assumed that the valve T11 of FIG. 1 "flips" at the time $t_1$, i.e., no longer returns into the current blocking state, and can therefore no longer take up the reverse voltage ($U_{T11}$). The dc current $I_{D1N}$ of the disturbed partial frequency changer UR1 is superimposed by a very large transient short-circuit current spike, while the current $I_{D2N}$ in the dc circuit of the undisturbed partial frequency changer UR2 decays to 0 to the inverter out-of-step limit due to the switching of the corresponding partial frequency changer NSR1. This represents a very heavily asymmetrical operating state which deviates from the desired parallel operation of the two partial frequency changers. The magnitude of the overcurrent spike in the current $I_{D1N}$ can be limited in this case merely by the measure that running away or heavy overshoot of the current controller setting signals $U_{A1}$, $U_{A2}$ is prevented by blocking the current controllers at the time $t_2$. Even so, heavy overshoot in the second signal $U_{A1}$ of the dc current controller belonging to the originally disturbed partial frequency changer cannot be avoided at the end of the fault, i.e., when the short-circuit current $I_{DIN}$ disappears and the blocking of the controller is cancelled at the time $t_3$. It is seen in FIG. 5 that all transition processes have decayed only about 3½ time units ZE after the end of the fault at the time $t_3$ while the dc currents $I_{D1N}$ and $I_{D2N}$ have reached their original magnitude and shape at the time $t_5$ again.

From the waveforms of FIG. 6, on the other hand, it can be seen that due to the magnetic coupling according to the invention, parallel operation of both partial frequency changers is ensured for the duration of the fault, such as a temporary short-circuit in one of the partial frequency changers. Thus, the two currents $I_{D1N}$ and $I_{D2N}$ in the dc circuits GK1 and GK2, at the instant when the fault occurs at the time $t_1$ are superimposed by a transient short-circuit current spike in almost the same manner. As compared to the current spike in the current $I_{D1N}$ in FIG. 5, the current spikes according to FIG. 6 are considerably lower and approximately of the same magnitude. Since now the effect of the fault in one of the partial frequency changers is distributed nearly uniformly over the two partial frequency changers, it cannot be presumed that the dc current controllers $Ri_1$ and $Ri_2$ exhibit a very heavily deviating overshoot behavior during and after the duration of the fault. Thus, it is not necessary to block the dc current controller for the duration of the fault. As can be seen from FIG. 6, the dc current controllers take back the setting signals $U_{A1}$ and $U_{A2}$ in the range between the occurrence of the fault at the time $t_1$ and the end of the fault at the time $t_3$ almost uniformly up to the inverter fall-out limit. The lead control effect of the coupling according to the invention can be seen particularly clearly by the fact that a sign reversal of the setting signal $U_{A2}$ of the undisturbed partial frequency changer UR1 at the point in time $t_6$ takes place slightly prior to the corresponding sign reversal of the setting signal $U_{A1}$ belonging to the disturbed partial frequency changer UR2 at the time $t_7$. After the end of the fault at the time $t_3$ and especially after the resumption of the normal sequence of commutation at the time $t_4$, the dc current controllers settle to the steady-state values without appreciable deviation of the setting signals $U_{A1}$ and $U_{A2}$.

If in spite of the magnetic coupling of the coils in the dc circuits of the partial frequency changer, the dc current controllers are blocked after the occurrence of a fault, a further improved harmonization of the operating behavior of the parallel partial frequency changers for the duration of the fault can be achieved. Such a case is shown in FIG. 7. Here the controllers are blocked at the time $t_2$ after the occurrence of the fault at the time $t_1$. It is seen that as a result thereof, considerably smaller transient short-circuit current cusps occur in the currents $I_{D1N}$ and $I_{D2N}$ as compared to FIG. 6 and decay correspondingly faster. The overall system is disturbed so little by the heavily damped short-circuit current which is distributed almost uniformly over the two partial systems, that the dc currents $I_{D1N}$ and $I_{D2N}$, after cancellation of the control block at the point $t_3$ and after the start of the normal commutation sequence at the time $t_4$, have reached their original magnitude again approximately at the time $t_5$.

What is claimed:

1. In a frequency changer having at least two parallel partial frequency changers, each partial frequency changer having an intermediate dc circuit and chokes in the intermediate dc circuit, where each partial frequency converter forms a separate single or multiphase system that works in parallel on a load such that each of the single or multiphase systems causes a rotating field in the load, the improvement comprising:

magnetic couplings which positively magnetically couple the chokes of the parallel partial frequency changers to each other such that a change of the dc current in the intermediate dc circuit of one partial frequency changer causes a change of the dc currents in the intermediate dc circuits of another parallel partial frequency changer in the sense of a precontrol.

2. The frequency changer of claim 1, wherein the number of parallel partial frequency changers working on a load is an even number, and the chokes are magnetically coupled such that magnetic dc fluxes in the magnetic coupling caused by the chokes are cancelled.

3. The frequency changer of claim 1, wherein the chokes are magnetically coupled such that magnetic dc fluxes caused by the chokes add in the magnetic coupling.

4. The frequency changer of claim 3, further comprising means for clocking the parallel partial frequency changers phase-shifted relative to each other such that the number of pulses of the frequency changer is greater than the number of pulses of the individual partial frequency changers.

5. The frequency changer of claim 4, wherein the parallel partial frequency changers are coupled separately to the load whereby a single or three-phase system with a greater number of pulses is created inside the load.

6. The frequency changer of claim 5, wherein the partial frequency changers are 6-pulse partial frequency changers, having converters on a network side and a load side, each with the intermediate dc circuit between the converter on the network side and the converter on the load side of each partial frequency changer.

7. The frequency changer of claim 6, wherein the load is a synchronous machine.

* * * * *